United States Patent
Arisawa et al.

(10) Patent No.: US 7,149,471 B1
(45) Date of Patent: *Dec. 12, 2006

(54) PORTABLE CELLULAR PHONE

(75) Inventors: Ryukou Arisawa, Kanagawa (JP); Hiroyuki Sasaki, Kanagawa (JP); Yuichi Fujii, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1102 days.

This patent is subject to a terminal disclaimer.

(21) Appl. No.: 09/642,221

(22) Filed: Aug. 18, 2000

(30) Foreign Application Priority Data

Aug. 20, 1999 (JP) .................... 11-234253

(51) Int. Cl.
*H04H 1/00* (2006.01)
*G10H 7/00* (2006.01)
*G06F 15/167* (2006.01)

(52) U.S. Cl. .................. 455/3.04; 455/414.1; 455/419; 455/517; 84/645; 709/219

(58) Field of Classification Search .............. 455/556, 455/550, 412, 414, 466, 3.01, 3.02, 3.04, 455/567, 563, 186.1, 420, 556.1–556.2, 414.1, 455/412.1, 550.1, 418, 419, 412.2; 370/352, 370/409; 709/219, 229, 217, 220–222, 231, 709/247; 717/178; 704/258, 500; 84/605, 84/645

See application file for complete search history.

(56) References Cited

U.S. PATENT DOCUMENTS

| | | | | |
|---|---|---|---|---|
| 5,594,779 A | * | 1/1997 | Goodman | 455/3.04 |
| 5,636,276 A | * | 6/1997 | Brugger | 705/54 |
| 5,890,910 A | * | 4/1999 | Tsurumi et al. | 434/307 A |
| 5,892,171 A | * | 4/1999 | Ide | 84/622 |
| 5,900,564 A | | 5/1999 | Kurakake | |
| 5,914,941 A | | 6/1999 | Janky | |
| 5,926,624 A | * | 7/1999 | Katz et al. | 709/217 |
| 5,926,789 A | * | 7/1999 | Barbara et al. | 704/270.1 |
| 6,014,569 A | * | 1/2000 | Bottum | 455/466 |
| 6,038,591 A | * | 3/2000 | Wolfe et al. | 709/206 |
| 6,222,838 B1 | * | 4/2001 | Sparks et al. | 370/352 |
| 6,236,832 B1 | * | 5/2001 | Ito | 455/3.06 |
| 6,253,246 B1 | * | 6/2001 | Nakatsuyama | 709/233 |
| 6,314,094 B1 | * | 11/2001 | Boys | 370/352 |
| 6,366,791 B1 | * | 4/2002 | Lin et al. | 455/567 |
| 6,423,892 B1 | * | 7/2002 | Ramaswamy | 84/609 |
| 6,496,692 B1 | * | 12/2002 | Shanahan | 455/418 |

(Continued)

FOREIGN PATENT DOCUMENTS

JP 11-88556 7/1989

(Continued)

OTHER PUBLICATIONS

Comline Telecommunications, World Reporter, NTT Mobile Communications Networks "Subscribers to NTT DoCoMo 's I-Mode Service Top 1 Million", Aug. 16, 199, World Reporter, Comline Telecommunications.*

(Continued)

*Primary Examiner*—Charles N. Appiah
(74) *Attorney, Agent, or Firm*—Pearne & Gordon LLP

(57) ABSTRACT

Music data stored in a data card 101 is input into a portable cellular phone 110, and also a plurality of pieces of application software (131, 133) suitable for a music data format defined in connection with the music data is selected by a user and downloaded from a remote server 130. According to this configuration, the application software in association with the music data can be downloaded from the server in response to the user's selection.

10 Claims, 5 Drawing Sheets

U.S. PATENT DOCUMENTS

| | | | |
|---|---|---|---|
| 6,516,466 B1 * | 2/2003 | Jackson | 725/62 |
| 6,549,942 B1 * | 4/2003 | Janky et al. | 709/219 |
| 6,563,770 B1 * | 5/2003 | Kokhab | 369/30.08 |
| 6,587,684 B1 * | 7/2003 | Hsu et al. | 455/419 |
| 6,597,891 B1 * | 7/2003 | Tantawy et al. | 455/3.05 |
| 6,640,306 B1 * | 10/2003 | Tone et al. | 726/4 |
| 6,662,231 B1 * | 12/2003 | Drosset et al. | 709/229 |
| 6,728,531 B1 * | 4/2004 | Lee et al. | 455/419 |
| 6,741,869 B1 * | 5/2004 | Lehr | 455/557 |
| 6,845,398 B1 * | 1/2005 | Galensky et al. | 709/231 |
| 6,871,048 B1 * | 3/2005 | Takagaki | 455/66.1 |
| 6,928,261 B1 * | 8/2005 | Hasegawa et al. | 455/3.01 |
| 6,928,468 B1 * | 8/2005 | Leermakers | 709/221 |
| 7,039,686 B1 * | 5/2006 | Arisawa et al. | 709/219 |

FOREIGN PATENT DOCUMENTS

| | | | |
|---|---|---|---|
| JP | 10-173737 A | * | 6/1999 |
| JP | 11-164058 | | 6/1999 |

OTHER PUBLICATIONS

UK Government: Mobile Phones—The next generation, "M2 Presswire". Coventry: May 7, 1999, p. 1.*

Patent Abstracts of Japan, Sato Noboru et al., Portable Type Music Selection/Viewing System, Jun. 1999.

Patent Abstracts of Japan, Okamoto Takeya, Communicator and Software Distribution System Using the Communicator, Mar. 1999.

* cited by examiner

PORTABLE CELLULAR PHONE

BACKGROUND OF THE INVENTION

The present invention relates to a portable cellular phone and, more particularly, a portable cellular phone capable of downloading application software in association with music data from a server based on user's selection and also executing the application software (program) downloaded in association with the music data.

In the prior art, as set forth in Japanese Patent Publication Hei 11-164058, a portable cellular phone that can select remote music data and listen the music is known. This configuration is shown in FIG. 5.

In FIG. 5, in a portable cellular phone 60 in which a memory device 66 is built in its main body 61, music data that have already been distributed from a record production company to a distribution center by operating push buttons, or the like on the main body 61 to call the distribution center are output to a receiver 64 and a display 62 and also stored in a memory device 66. Thus, the user is able to enjoy the music by reproducing the music data stored in the memory device 66 after the connection of the public network is cut off.

Also, in a portable cellular phone 70 which has a memory medium 76 detachably attached to a main body 71, the user can download the music data into a memory medium 76 of the portable cellular phone 70 by operating push buttons, or the like of the main body 71 to enjoy the music data via a display 72 of the portable cellular phone 70 or a receiver 74, and also the user can enjoy the reproduced music of higher quality by pulling out the memory medium 76 and then inserting it into other audio unit. In addition, the user can enjoy the music by storing the music data into the memory medium 76 by using other audio unit and then inserting the memory medium 76 into the portable cellular phone 70.

However, the conventional portable cellular phone that can select the music and listen it has such problems that contents of listenable music data are identical in specification to the music data distributed from the record production company or via other audio unit and also the user cannot reproduce the music data according to user's own favorite specifications although lyric lines can be displayed on a display of the portable cellular phone.

SUMMARY OF THE INVENTION

The present invention is made to overcome the above problems in the prior art, and it is an object of the present invention to provide a portable cellular phone capable of downloading an application software in association with music data from a server to main body of the cellular phone.

According the first aspect of the invention, a portable cellular phone comprises: a music data retrieving means which retrieves music data; and a downloading means which downloads an application software corresponding to a music data format defined in connection with the music data from a remote server in response to user's selection.

Preferably, the music data is input from a storage medium.

Further, the music data is input via a communication line.

According to this configuration, the application software in association with the music data can be downloaded from the server in response to the user's selection.

Moreover, the portable cellular phone according to the present invention further comprises an application software executing means which executes the application software in association with the music data in the cellular phone.

According to this configuration, the application software in association with the music data can be downloaded from the server in response to the user's selection and then the downloaded application software can be executed.

Further, according to the portable cellular phone of the present invention, the application software executing means executes a plurality of pieces of application software in parallel simultaneously in association with the music data.

According to this configuration, the application software in association with the music data can be downloaded from the server and then a plurality of pieces of downloaded application software can be executed simultaneously in parallel.

DETAILED DESCRIPTION OF THE PREFERRED EMBODIMENT

Embodiments of the present invention will be explained with reference to FIG. 1 to FIG. 4 hereinafter.

Figure 1:
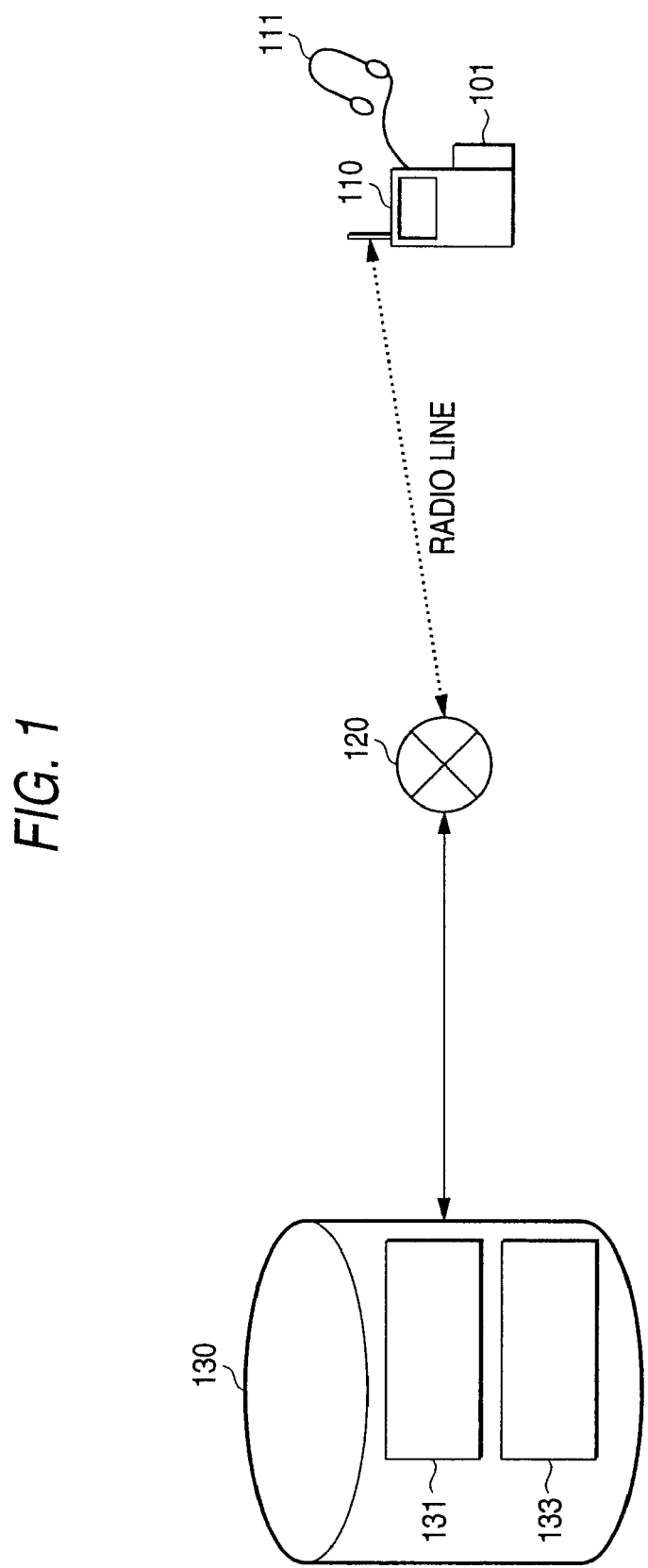
FIG. 1 is a view showing a configuration for downloading an application software from a server to a portable cellular phone according to the present invention.

FIG. 1 is a view showing a configuration for downloading application software from a server to a portable cellular phone according to the present invention. In FIG. 1, a portable cellular phone 110 of the present invention is constructed such that music data can be input into a main body of the cellular phone from a data card 101 into which the music data are input previously, for example. The music data being input into the data card 101 are music data loaded in the music data format such as MP3, MPEG, Quick-Time, etc., for example. Although not shown, the music data having the above music data format can be purchased (copied) previously from a PC (personal computer) via the Internet or from a dedicated terminal installed in the convenience store, etc., for example, into the data card 101.

In this manner, the music data are input into the main body of the cellular phone. In this case, the application software for reproducing the music data is not incorporated in advance into the portable cellular phone at the time of production, but the software for the reproduction is downloaded from the server.

That is, if the application software for reproduction has already been downloaded from the server in response to the user's selection and then incorporated into the portable cellular phone, the music data can be reproduced based on the user's favorite specification via a headphone 111 and a displaying means attached to a portable cellular phone 110 by executing the software as it is.

In case the application software for reproduction has not been downloaded from the server and not been incorporated into the portable cellular phone main body, the user inquires of an information provider (application storage server) 130 if the provider has any application softwares, via a communication network 120 by using a data communication mode of the portable cellular phone. Then, if the user can find the desired application software, such user instructs the portable cellular phone to download such software by operating the buttons. After the download, the user can reproduce the music data by executing the application software via the headphone 111 and the displaying means attached to the portable cellular phone 110 according to the user's favorite specification.

Figure 2:
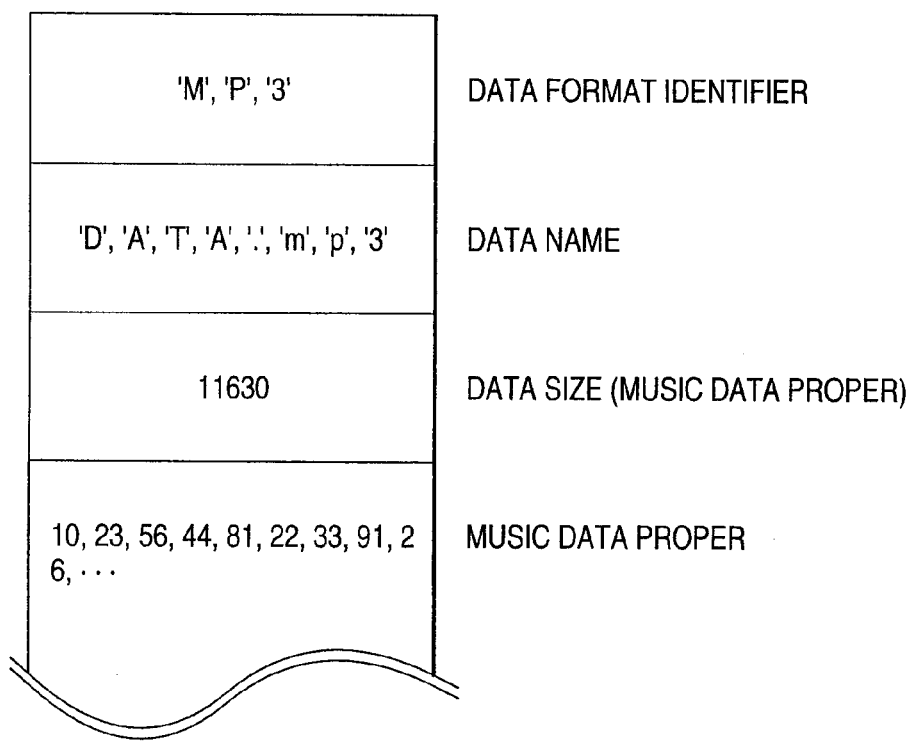
FIG. 2 is a view showing a format of music data according to an embodiment of the present invention.

FIG. 2 is a view showing a format of the music data. The music data of MP3 is shown in FIG. 2. To explain further FIG. 2, "MP3" as a data format identifier, "data MP3" as a data name, "11630" byte as a data size of the music data main body, the data "10, 23, 56, 44, 81, 22, 33, 91, 26, . . . " represented by the decimal digit in place of the usual binary digit as the content of the music data main body, etc. are loaded in the format.

Figure 3:
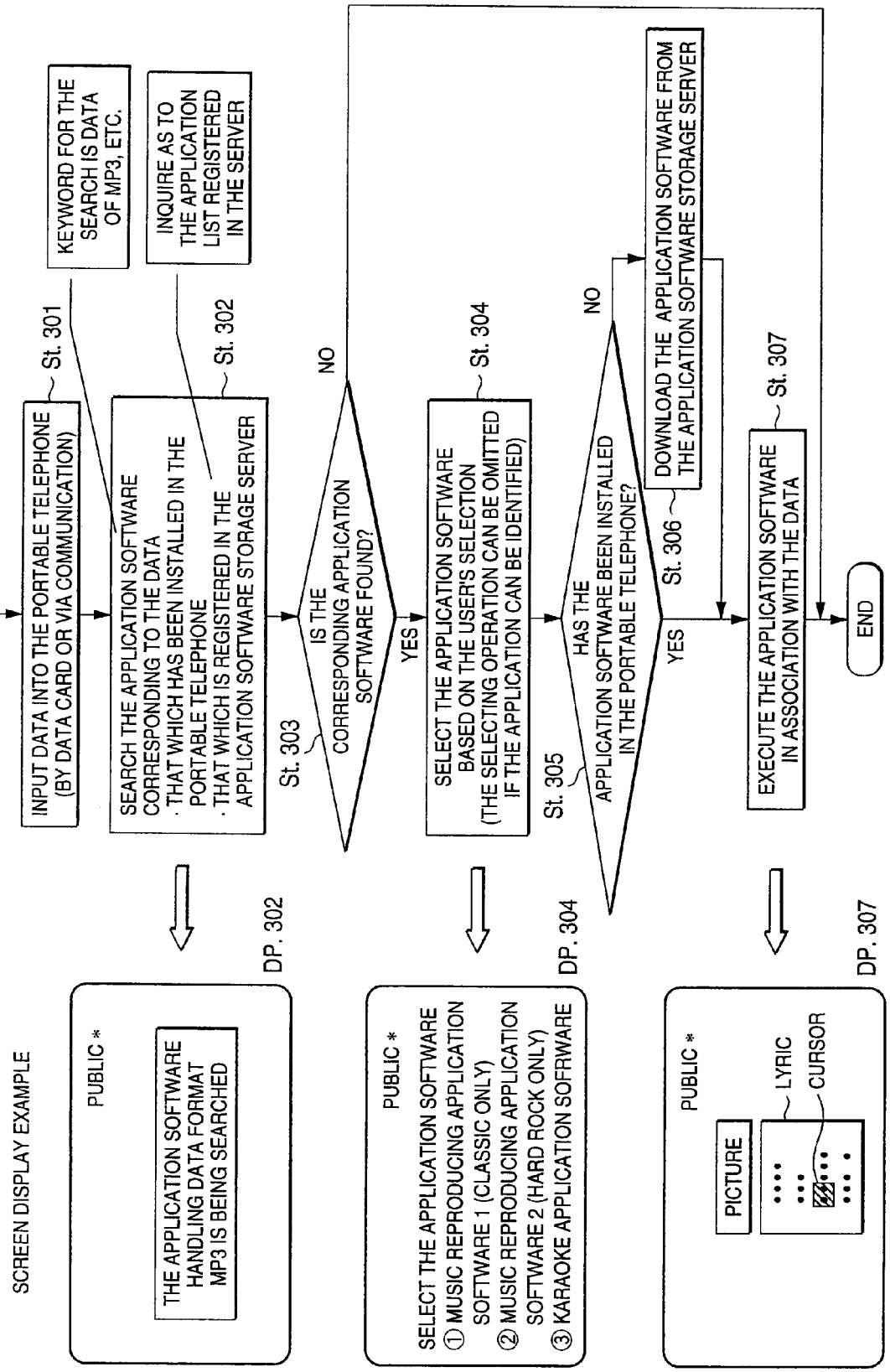
FIG. 3 is a flowchart illustrating operations for downloading the application software from the server to the portable cellular phone according to the present invention.

FIG. 3 is a flowchart illustrating operations for downloading the application software from the server to the portable cellular phone according to the present invention shown in FIG. 1. Explanation will be made with reference to this flowchart hereunder.

First, in step (abbreviated as "St." in FIG. 3) 301, the user inputs the music data into the main body of the portable cellular phone. The music data are input by using the data card shown in FIG. 1 or an I/O interface (not shown) attached to the main body via the communication line. Various methods other than the personal computer (PC) and the dedicated terminal, as already explained, may be considered as the way of receiving the data into the data card. The technical concept of the present invention is not limited to the data inputting method described above.

Then, in step 302, the user searches the presence of the application software corresponding to the above music data. At this time, information shown in the screen display example DP.302 can be displayed on the displaying means of the portable cellular phone. Then, first the user searches the history indicating whether or not such application software has already been incorporated into the main body of the portable cellular phone. For example, if the application software for the reproduction such as data format MP3, etc. has already been incorporated, the user can know by such search the fact that the application software has already been incorporated into the main body of the portable cellular phone.

If there is no history indicating that such application software has already been input, the application software corresponding to the music data format is not incorporated into the main body of the portable cellular phone. Therefore, the user searches whether or not the application software has been registered in the information provider (application storage server), via the above communication network. At this time, the user can search the application software by the main body of the portable cellular phone by inquiring of the information provider (application storage server) as to the application software list registered in the above server via the main body of the portable cellular phone. Thus, the user can check based on the list whether or not the desired application software is registered in the application storage server. The user does not select the application software at this stage.

Then, in step 303, if the corresponding application software has not been found in both the main body of the portable cellular phone and the application storage server based on the searched result, the music data cannot be reproduced even after such music data is incorporated in the main body with much effort, and therefore the process is ended. In contrast, in step 303, if the corresponding application software has been found, the process goes to step 304.

In step 304, the user selects the desired application software based on the user's operation. At this time, information as shown in the screen display example DP.304 can be displayed on the displaying means of the portable cellular phone.

An example in which a reproducing application 131 and a karaoke application 133 are registered in the information provider (application storage server) 130 shown in FIG. 1 is illustrated. In the screen display example in FIG. 3, it is shown that the music reproducing application is further divided into a part 1 and a part 2. The part 1 indicates that the music reproducing application suitable for the classic is registered in the server, and the part 2 indicates that the music reproducing application suitable for the hard rock is registered in the server. In this case, the selecting operation can be omitted if the application software can be identified uniquely.

Then, the process advances to step 305. It is decided whether or not the application software has been incorporated into the main body of the portable cellular phone. As the result of this decision, if the application software has not been incorporated into the main body of the portable cellular phone, the process goes to step 306. In step 306, the application software selected by the user is downloaded from the application storage server. Then, the process proceeds to step 307.

In contrast, in step 305, if the application software has been incorporated into the main body of the portable cellular phone, the process goes to step 307. In step 307, the user executes the application software selected by the user in connection with the data. At this time, if the user has selected the karaoke application, it is possible to display the screen as shown by the screen display example DP.307 and lyric lines, on which a singing position is indicated, on the displaying means of the portable cellular phone. The process is ended after the execution of the application software is finished.

Figure 4:
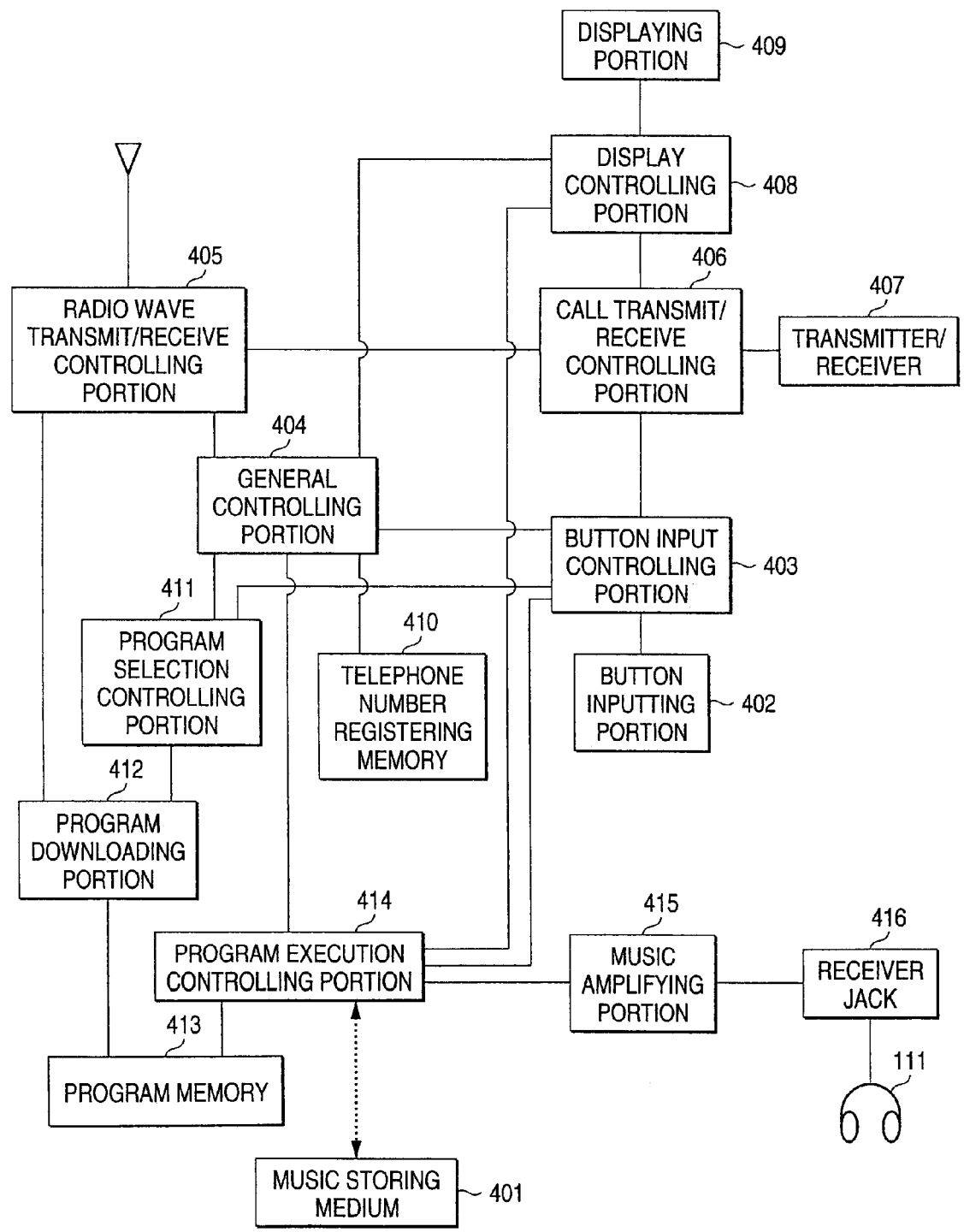
FIG. 4 is a block diagram showing a configuration of the portable cellular phone according to the present invention.
Figure 5:
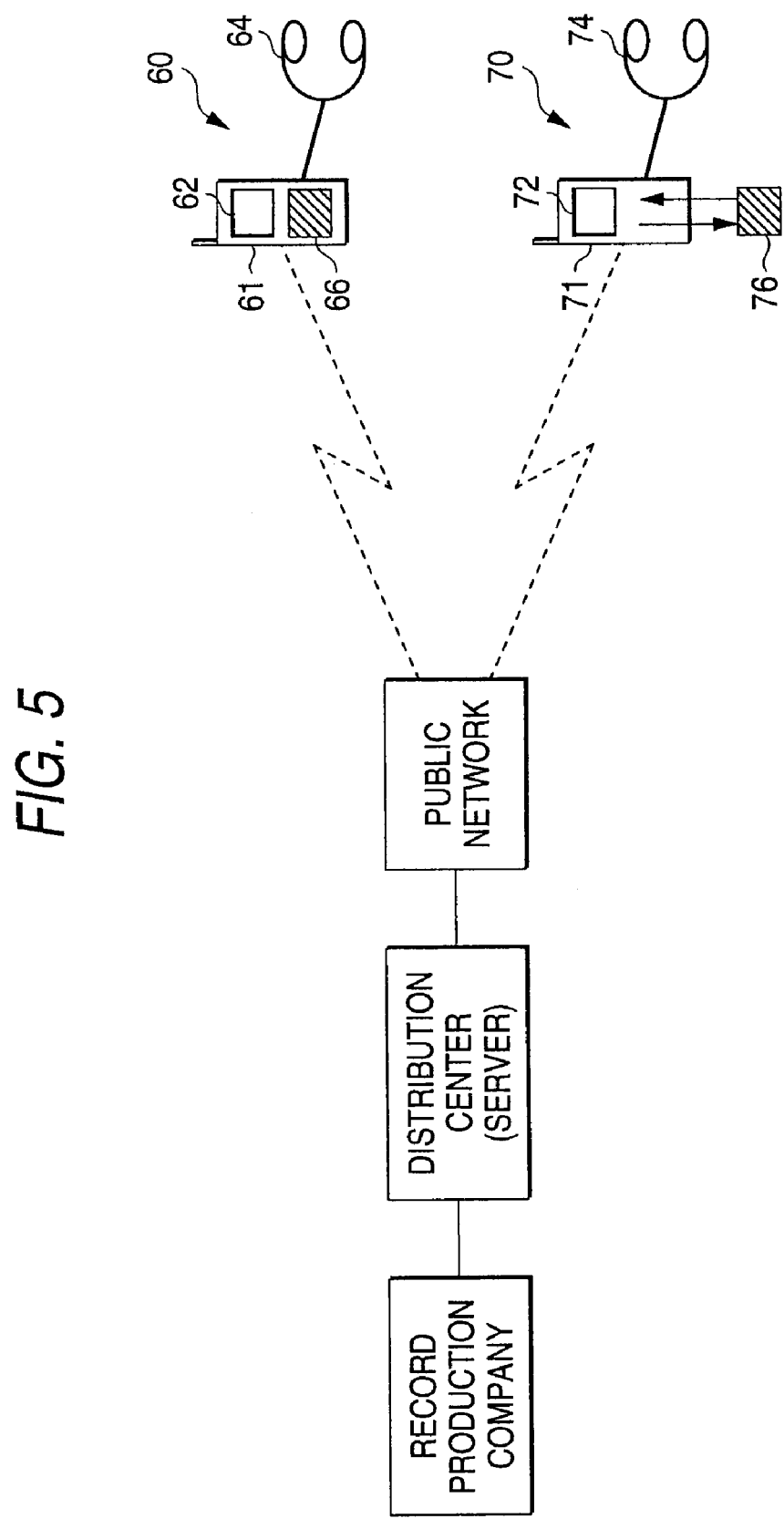
FIG. 5 is a view showing a configuration of a portable cellular phone in the prior art, which can select the music and listen it.

FIG. 4 is a block diagram showing a configuration of the portable cellular phone according to the present invention. In FIG. 4, the constituent portion for the normal radio telephone communication serving as the portable cellular phone will not explained again since such portion has been widely known by the person skilled in the art. Only the constituent portion that is associated with the present invention will be explained hereunder.

FIG. 4 will be explained in compliance with the above explanation in FIG. 3 hereunder. For example, a music storing medium 401 (containing the above data card, and MD, DVD, CD-ROM, etc. may be used) in which the music data loaded by the MP3 data format is stored is input into the main body of the unit (step 301).

Then, when the user sends a command to a general controlling portion 404 via a button input controlling portion 403 by operating a button inputting portion 402, the location of the application software corresponding to the above music data is searched. If the program has already downloaded and then incorporated into the main body of the portable cellular phone, the program has stored in a program memory 413. Therefore, the general controlling portion 404 causes a program execution controlling portion 414 to operate to read contents stored in the program memory 413.

At this time, information as shown in the screen display example DP.302 is displayed on a displaying portion 409. If it is found based on the search that the application software is incorporated into the main body of the portable cellular phone, and the user sets the portable cellular phone to the data communication available mode, for example, to inquire of the server if any application softwares are registered in the remote server. At this time, the general controlling portion 404 and a radio wave transmit/receive controlling portion 405 are operated. Since inquired results are displayed on the displaying portion 409 as the list, the user can find based on this display that the corresponding application software is registered in the server (step 302).

If the application software can be found in either the main body of the portable cellular phone or the remote server, such application software is displayed on the displaying portion 409. Therefore, the user can select the user's favorite application software by operating the button inputting portion 402 (steps 303, 304, DP.304).

Since the selected information is given to a program selection controlling portion 411, the general controlling portion 404 starts to prepare for the executing operation of the program. Then, if the user's favorite application software is downloaded from the server, the user operates the general controlling portion 404 and the radio wave transmit/receive controlling portion 405 to download the program from the remote server.

The downloaded program is input into a program downloading portion 412, and also stored in the program memory 413. If the program has already been downloaded and incorporated into the main body of the portable cellular phone, the program has been stored in the program memory 413. Therefore, the user can fetch the program from the program memory 413 in response to the instruction issued from the program selection controlling portion 411.

The execution of the application program is carried out based on control of the program execution controlling portion 414. The music data can be reproduced by a headphone 111 via a music amplifying portion 415 and a receiver jack 416, while the data such as the picture, the lyric lines, etc. are displayed on the displaying portion 409.

The program execution controlling portion 414 is formed of many microprocessors. Therefore, in order to execute a plurality of pieces of application software, the program execution controlling portion 414 is constructed such that a plurality of microprocessors are provided to operate simultaneously in parallel with each other.

As described above, according to the portable cellular phone of the present invention, there can be achieved such advantages that the application software in association with the music data can be downloaded from the server in response to the user's selection and also the downloaded program can be executed in association with the music data.

What is claimed is:

1. A portable cellular phone comprising:
   a music data retrieving means which retrieves music data; and
   a downloading means which downloads an application software corresponding to a music data format defined in connection with the music data from a remote server.

2. The portable cellular phone according to claim 1, wherein the retrieving means retrieves the music data from a storage medium.

3. The portable cellular phone according to claim 1, wherein the retrieving means retrieves the music data via a communication means.

4. The portable cellular phone according to claim 1, further comprising an application software executing means which executes the application software in association with the music data in the cellular phone.

5. The portable cellular phone according to claim 4, wherein the application software executing means executes a plurality of pieces of application software in parallel simultaneously in association with the music data.

6. A method of operating a portable cellular phone comprising the steps of:
   the cellular phone retrieving music data;
   a user selecting an application software corresponding to a music data format defined in connection with the music data; and
   downloading the application software from a remote server to the cellular phone.

7. The portable cellular phone according to claim 1, wherein the downloading means downloads the application software via a wireless communicating means.

8. A portable cellular phone comprising:
   a music data retrieving means which retrieves music data;
   a downloading means which downloads an application software corresponding to a music data format defined in connection with the music data from a remote server; and
   an application software executing means which executes the application software in association with the music data in the cellular phone;
   wherein the application software executing means executes a plurality of pieces of application software in parallel simultaneously in association with the music data.

9. The portable cellular phone according to claim 8, wherein the retrieving means retrieves the music data from a storage medium.

10. The portable cellular phone according to claim 8, wherein the retrieving means retrieves the music data via a communication means.

* * * * *